United States Patent
Cooley et al.

(10) Patent No.: US 8,932,750 B2
(45) Date of Patent: Jan. 13, 2015

(54) ALUMINUM HOUSING WITH A HERMETIC SEAL

(75) Inventors: John J Cooley, Boston, MA (US); Riccardo Signorelli, Cambridge, MA (US); Christopher J S Deane, Boston, MA (US); James Epstein, Sharon, MA (US)

(73) Assignee: Fastcap Systems Corporation, Boston, MA (US)

( * ) Notice: Subject to any disclaimer, the term of this patent is extended or adjusted under 35 U.S.C. 154(b) by 213 days.

(21) Appl. No.: 13/560,628

(22) Filed: Jul. 27, 2012

(65) Prior Publication Data

US 2013/0029215 A1 Jan. 31, 2013

Related U.S. Application Data

(60) Provisional application No. 61/512,090, filed on Jul. 27, 2011.

(51) Int. Cl.
| | |
|---|---|
| *H01M 2/02* | (2006.01) |
| *H01M 2/04* | (2006.01) |
| *H01M 2/30* | (2006.01) |
| *H01G 9/00* | (2006.01) |
| *B23K 20/10* | (2006.01) |
| *B23K 9/00* | (2006.01) |
| *H01G 11/78* | (2013.01) |
| *H01G 11/80* | (2013.01) |
| *H01G 11/82* | (2013.01) |
| *B23K 26/20* | (2014.01) |
| *H01M 2/06* | (2006.01) |

(52) U.S. Cl.
CPC ............. *H01M 2/0426* (2013.01); *H01G 11/78* (2013.01); *H01G 11/80* (2013.01); *H01G 11/82* (2013.01); *B23K 26/206* (2013.01); *H01M 2/0252* (2013.01); *H01M 2/0285* (2013.01); *H01M 2/0287* (2013.01); *H01M 2/0486* (2013.01); *H01M 2/065* (2013.01); *Y02E 60/13* (2013.01); *H01M 2/022* (2013.01); *H01M 2/046* (2013.01)
USPC .......... 429/179; 429/163; 29/25.03; 29/623.2; 361/518

(58) Field of Classification Search
USPC .......... 429/179, 161, 162, 163, 211, 175, 176; 29/623.1, 623.2, 23.03; 361/518
See application file for complete search history.

(56) References Cited

U.S. PATENT DOCUMENTS

| | | | |
|---|---|---|---|
| 4,326,016 A * | 4/1982 | Selover et al. ................ | 429/184 |
| 6,881,516 B2 * | 4/2005 | Aamodt et al. ................ | 429/181 |
| 6,924,059 B1 * | 8/2005 | Kawakami et al. ........... | 429/162 |
| 2003/0003356 A1 * | 1/2003 | Tsukamoto et al. .......... | 429/176 |
| 2003/0027038 A1 * | 2/2003 | Tsukamoto et al. .......... | 429/122 |
| 2006/0115722 A1 * | 6/2006 | Kim ............................. | 429/161 |
| 2006/0292442 A1 * | 12/2006 | Shah et al. ................... | 429/181 |

* cited by examiner

*Primary Examiner* — Kenneth Douyette
(74) *Attorney, Agent, or Firm* — Wolf, Greenfield & Sacks, P.C.

(57) ABSTRACT

A housing for an energy storage cell includes an interior which provides beneficial properties to fabricators of the cell. The cell may be hermetically sealed by conventional laser welding techniques.

36 Claims, 4 Drawing Sheets

ALUMINUM HOUSING WITH A HERMETIC SEAL

BACKGROUND OF THE INVENTION

1. Field of the Invention

The invention disclosed herein relates to energy storage cells, and in particular to an aluminum container for an energy storage cell, where the housing is sealed with an hermetic seal.

2. Description of the Related Art

Energy storage cells are ubiquitous in our society. While most people recognize an energy storage cell simply as a "battery," other types of cells may be included. For example, recently, ultracapacitors have garnered much attention as a result of their favorable characteristics. In short, many types of energy storage cells are known and in use today.

As a general rule, an energy storage cell includes an energy storage media disposed within a housing (such as a canister). While a metallic canister can provide robust physical protection for the cell, such a canister is typically both electrically and thermally conductive and can react with the energy storage cell. Typically, such reactions increase in rate as ambient temperature increases.

The electrochemical or other properties (such as conductivity) of many canisters can cause poor initial performance and lead to premature degradation of the energy storage cell, especially at elevated temperatures.

Aluminum is attractive to designers of such housings, however, use of aluminum is fraught with complications. For example, no one has been able to provide a hermetic seal with an aluminum housing (i.e., a seal with a leak rate of less than 5E-6 std cc He/sec). Known techniques for providing an hermetic seal involve use of glass-to-metal sealing techniques, which typically involve fusing glass to stainless steel. Generally, the temperature required to achieve this type of seal is in excess of 1,000 degrees Celsius, which is well beyond the melting point of aluminum (660 degrees Celsius).

What are needed are methods and apparatus for providing a housing for an energy storage cell that exhibits favorable properties, such as electrochemical properties as well as conductivity. Preferably, the methods and apparatus result in improved performance at a minimal cost.

BRIEF SUMMARY OF THE INVENTION

In one embodiment, a housing for an energy storage cell is disclosed. The housing includes a body formed of a first material that exhibits low chemical reactivity with an electrolyte, and a cap formed of a multi-layer material, the cap including a hermetically sealed electrode assembly disposed therein; wherein a first layer of the multi-layer material is compatible with the first material, and a second layer is compatible with hermetically sealing the assembly to the cap.

In another embodiment, a method for housing an energy storage cell is provided. The method includes selecting a body of a first material that exhibits low chemical reactivity with an electrolyte; selecting a cap formed of a multi-layer material, the cap including a hermetically sealed electrode assembly disposed therein, wherein a first layer of the multi-layer material is compatible with the first material, and a second layer is compatible with hermetically sealing the assembly to the cap; and placing the storage cell within the body.

In another embodiment, an energy storage is provided. The energy storage cell is disposed within a housing that includes a cap hermetically sealed to a body. The body is formed of a first material that exhibits low chemical reactivity with an electrolyte; the cap is formed of a multi-layer material and including a hermetically sealed electrode assembly disposed therein.

In another embodiment, an energy storage is provided. The energy storage includes a housing that has, at least in part, a multilayer material; wherein the housing includes a first layer of material that is substantially compatible with an energy storage cell disposed within the housing; and at least a second layer disposed over the first layer, wherein the second layer provides integrity for the housing.

In yet another embodiment, a method for fabricating an energy storage is provided. The method includes selecting a multilayer material; and incorporating the multilayer material into at least a portion of a housing of the energy storage; wherein the multilayer material includes a first layer of material that is substantially compatible with an energy storage cell disposed within the housing and at least a second layer disposed over the first layer, wherein the second layer provides for integrity for the housing once fabricated.

In yet another embodiment, an housing for an energy storage is disclosed. The housing includes a multilayer material, wherein a first layer of material is substantially compatible with an energy storage cell for disposition within the housing; and at least a second layer at least partially disposed over the first layer, wherein the second layer provides integrity for the housing.

BRIEF DESCRIPTION OF THE DRAWINGS

The foregoing and other features and advantages of the invention are apparent from the following detailed description taken in conjunction with the accompanying drawings in which.

DETAILED DESCRIPTION OF THE INVENTION

Disclosed herein is a housing for an energy storage cell. A combination of the energy storage cell and the housing provides users a power supply having improved electrical performance. The housing is simple to construct, and relatively economic to produce.

The energy storage may include any type of technology practicable. In various embodiments, the energy storage is a capacitor, in particular, an ultracapacitor. Other forms of energy storage may be used, including electrochemical batteries, in particular, lithium based batteries.

For example, in some embodiments, the energy storage may include batteries such as those that are adapted for operation in a harsh environment. Specific examples include various chemical batteries, including those with lithium. More specifically, examples include lithium-thionyl-chloride (Li—$SOCl_2$) and batteries based on similar technologies and/or chemistries. Other exemplary batteries that may be used to provide the energy storage cell include lithium-bromine-chloride, as well as lithium-sulfuryl-chloride and fused salt.

In general, layered materials are used in the housing. The layered materials provide fabricators with diverse properties that are beneficial in the construction of the housing. More specifically, and by way of example, the housing may present aluminum to substantially all interior surfaces (which may be exposed to electrolyte), while providing fabricators with stainless steel over some exterior surfaces (thus providing for welding and hermetically sealing of the housing). Accordingly, improved performance may be realized through reduced internal corrosion, increased electrical conductivity, elimination of problems associated with use of dissimilar metals in a conductive media and for other reasons as will be apparent to one skilled in the art. Advantageously, the housing makes use of existing technology, such as commercially available electrode inserts that include glass-to-metal seals (and may include stainless steel components). Accordingly, the housing is economic to fabricate.

A variety of embodiments of layered materials may be used. This results in a variety of options for fabrication of the energy storage.

Figure 1:
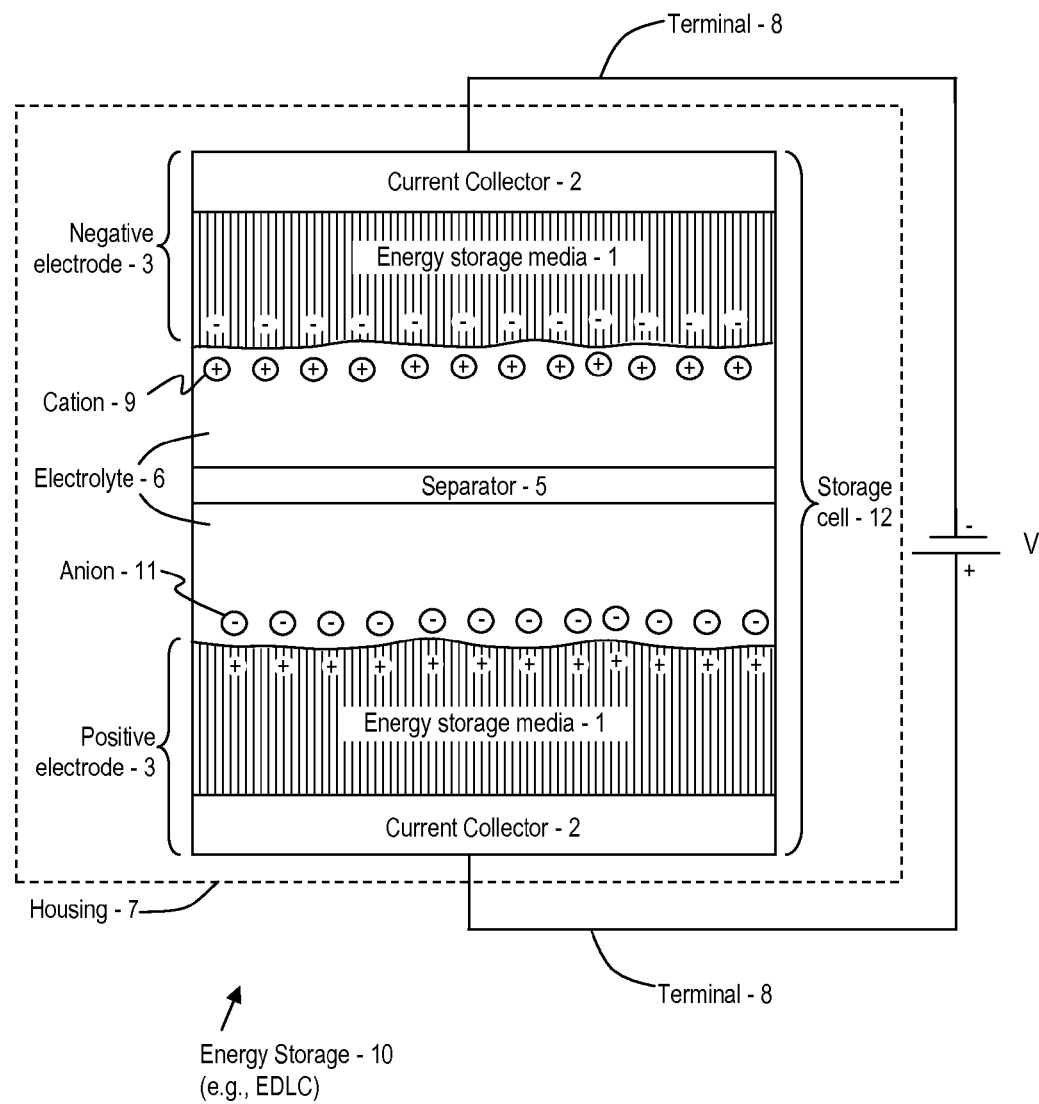
FIG. 1 depicts aspects of an ultracapacitor which may serve as an energy storage cell.

As shown in FIG. 1, an exemplary energy storage 10 is an electric double-layer capacitor (EDLC), also referred to as an "ultracapacitor," includes two electrodes (a negative electrode 3 and a positive electrode), each electrode 3 with a double layer of charge at an electrolyte interface. In some embodiments, a plurality of electrodes is included. However, for purposes of discussion, only two electrodes 3 are shown. As a matter of convention herein, each of the electrodes 3 in this exemplary embodiment uses a carbon-based energy storage media 1 (as discussed further herein) to provide energy storage.

Each of the electrodes 3 includes a respective current collector 2. The electrodes 3 may be separated by a separator 5. In general, the separator 5 is a thin structural material (usually a sheet) used to separate the electrodes 3 into two or more compartments. Each of the electrodes 3 is associated with a respective terminal 8. Each of the terminals 8 provides for electrical communication with contacts of a housing 7.

At least one form of electrolyte 6 is included, and fills void spaces in and between the electrodes 3 and the separator 5. In general, the electrolyte 6 is a chemical compound that disassociates into electrically charged ions. A solvent that dissolves the chemical compound may be included in some embodiments. A resulting electrolytic solution conducts electricity by ionic transport.

As a matter of convenience, a combination of the electrodes 3, the separator 5 and the electrolyte 6 are referred to as a "storage cell 12." In some embodiments, the term "storage cell" merely makes reference to the electrodes 3 and the separator 5 without the electrolyte 6.

Generally, the exemplary energy storage 10 is either of a wound or generally layered form which is then packaged into a cylindrical, prismatic or other appropriate type of enclosing housing 7 (which may be referred to simply as the "housing 7.") The housing 7 is then hermetically sealed. In various examples, the package is hermetically sealed by techniques making use of laser welding, ultrasonic welding, tungsten-inert-gas (TIG) welding, and/or other welding technologies.

In the exemplary energy storage 10, the energy storage media 1 may be provided by and include activated carbon, carbon fibers, rayon, graphene, aerogel, carbon cloth, and/or carbon nanotubes. Activated carbon electrodes can be manufactured, for example, by producing a carbon base material by carrying out a first activation treatment to a carbon material obtained by carbonization of a carbon compound, producing a formed body by adding a binder to the carbon base material, carbonizing the formed body, and finally producing an active carbon electrode by carrying out a second activation treatment to the carbonized formed body.

Carbon fiber electrodes can be produced, for example, by using paper or cloth pre-form with high surface area carbon fibers.

In one specific example, multiwall carbon nanotubes (MWNT) on a variety of substrates using chemical vapor deposition (CVD) are fabricated for use in the electrodes 3. In one embodiment, low-pressure chemical vapor deposition (LPCVD) is used. The fabrication process may use a gas mixture of acetylene, argon, and hydrogen, and an iron catalyst deposited on the substrate using electron beam deposition and or sputtering deposition.

In some embodiments, material used to form the energy storage media 1 may include material other than pure carbon. For example, various formulations of materials for providing a binder may be included. In general, however, the energy storage media 1 is substantially formed of carbon, and is therefore referred to as a "carbonaceous material."

In short, although formed predominantly of carbon, the energy storage media 1 may include any form of carbon, and any additives or impurities as deemed appropriate or acceptable, to provide for desired functionality as the energy storage media 1.

The electrolyte 6 includes a pairing of a plurality of cations 9 and anions 11, and, in some embodiments, may include a solvent. Various combinations of each may be used. In the exemplary energy storage 10, the cation 11 may include 1-(3-cyanopropyl)-3-methylimidazolium, 1,2-dimethyl-3-propylimidazolium, 1,3-bis(3-cyanopropyl)imidazoliu, 1,3-diethoxyimidazolium, 1-butyl-1-methylpiperidinium, 1-butyl-2,3-dimethylimidazolium, 1-butyl-3-methylimidazolium, 1-butyl-4-methylpyridinium, 1-butylpyridinium, 1-decyl-3-methylimidazolium, 1-ethyl-3-methylimidazolium, 3-methyl-1-propylpyridinium, and combinations thereof as well as other equivalents as deemed appropriate.

In the exemplary energy storage 10, the anion 9 may include bis(trifluoromethanesulfonate)imide, tris(trifluoromethanesulfonate)methide, dicyanamide, tetrafluoroborate, hexafluorophosphate, trifluoromethanesulfonate, bis(pentafluoroethanesulfonate)imide, thiocyanate, trifluoro(trifluoromethyl)borate, and combinations thereof as well as other equivalents as deemed appropriate.

The solvent may include acetonitrile, amides, benzonitrile, butyrolactone, cyclic ether, dibutyl carbonate, diethyl carbonate, diethylether, dimethoxyethane, dimethyl carbonate, dimethylformamide, dimethylsulfone, dioxane, dioxolane, ethyl formate, ethylene carbonate, ethylmethyl carbonate, lactone, linear ether, methyl formate, methyl propionate, methyltetrahydrofuran, nitrile, nitrobenzene, nitromethane, n-methylpyrrolidone, propylene carbonate, sulfolane, sulfone, tetrahydrofuran, tetramethylene sulfone, thiophene, ethylene glycol, diethylene glycol, triethylene glycol, polyethylene glycols, carbonic acid ester, γ-butyrolactone, nitrile, tricyanohexane, any combination thereof or other material(s) that exhibit appropriate performance characteristics.

The separator 5 may be fabricated from non-woven glass. The separator 5 may also be fabricated from fiberglass, flouro-polymers, polytetrafluoroethylene (PTFE), and ceramics. For example, using non-woven glass, the separator 5 may include main fibers and binder fibers each having a fiber diameter smaller than that of each of the main fibers and allowing the main fibers to be bonded together.

Figure 2:
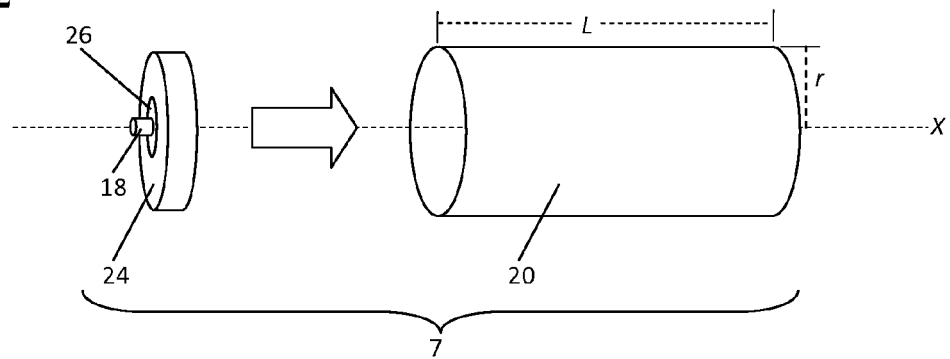
FIG. 2 illustrates an exemplary body and cap for housing an energy storage cell.

Refer now to FIG. 2, where aspects of an exemplary housing 7 are shown. The housing 7 (also referred to as a "canister", a "case" and by other similar terms) provides structure and physical protection for the energy storage 10. In this example, the housing 7 includes an annular cylindrically shaped body 20 and a complimentary cap 24. In this embodiment, the cap 24 includes a central portion that has been removed and filled with an electrical insulator 26. At least one contact 18 penetrates through the electrical insulator 26 to provide users with access to energy stored within the storage cell 12.

Generally, during assembly each terminal 8 of the storage cell 12 is mated with a respective contact 18. As shown in FIG. 2, the respective contact 18 may include a feed-through (or "pin") of a glass-to-metal seal. Another contact 18 may be realized with mating of one of the terminals to the body 20, such that the body 20 becomes one of the contacts 18. Each of the contacts 18 provides electrical access to energy stored in the energy storage media 1 of the storage cell 12.

In this example, the annular cylindrically shaped body 20 is symmetric about an axis, X, and has a radius, r, as well as a length, L.

In general, assembly of the housing 7 often involves assembly of various components and then an initial drying process. Exemplary drying includes separately heating the body 20, the cap 24 and the storage cell 12, often under a reduced pressure (e.g., a vacuum). The various components may be heated (i.e., dried) separately, assembled and then heated together. Once adequate (optional) drying has been performed, final steps of assembly may be performed. In the final steps, internal electrical connections are made, the cap 24 is installed, and the cap 24 is hermetically sealed to the body 20, by, for example, welding the cap 24 to the body 20. Generally, the energy storage 10 is then filled with the electrolyte 6 and a fill port of the energy storage 10 is then sealed.

In some embodiments, a material used for construction of the body 20 includes aluminum, which may include any type of aluminum or aluminum alloy deemed appropriate by a designer or fabricator (all of which are broadly referred to herein simply as "aluminum"). Various alloys, laminates, and the like may be disposed over (e.g., clad to) the aluminum (the aluminum being exposed to an interior of the body 20). Additional materials (such as structural materials or electrically insulative materials, such as some polymer-based materials) may be used to compliment the body and/or the housing 7. The materials disposed over the aluminum may likewise be chosen by what is deemed appropriate by a designer or fabricator. In general, the material(s) exposed to an interior of the housing 7 exhibit adequately low reactivity when exposed to the electrolyte 6 such that operation and a lifetime of the energy storage 10 are not substantially interfered with by unwanted chemical interactions.

Note that when a portion of the housing 7 will be used to conduct electricity from or to the energy storage media 1, it may be favorable to construct that portion of the housing 7 from a highly conductive metal, such as aluminum as opposed to stainless steel.

Although this example depicts only one contact 18 on the cap 24, it should be recognized that the construction of the housing 7 is not limited by the embodiments discussed herein.

For example, the cap 24 may include a plurality of contacts 18. In some embodiments, the body 20 includes a second, similar cap 24 at the opposing end of the annular cylinder. Further, it should be recognized that the housing 7 is not limited to embodiments having an annular cylindrically shaped body 20. For example, the housing 7 may be a clamshell design, a prismatic design, a pouch, or of any other design that is appropriate for the needs of the designer, manufacturer or user.

Figure 3:
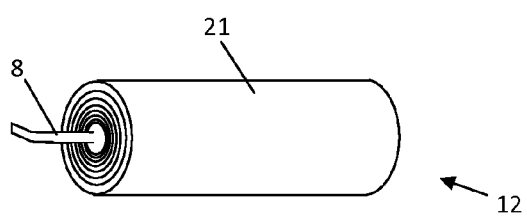
FIG. 3 illustrates an embodiment of a form for the energy storage cell.
Figure 7:
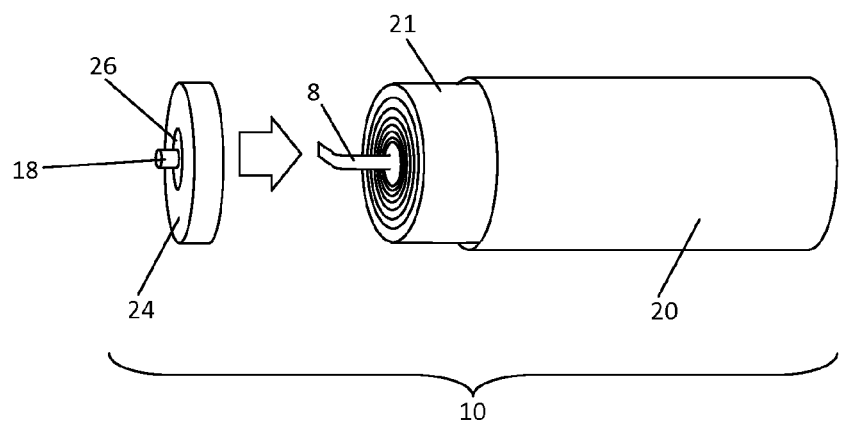
FIG. 7 depicts an arrangement of the energy storage cell in assembly.
Figure 9:
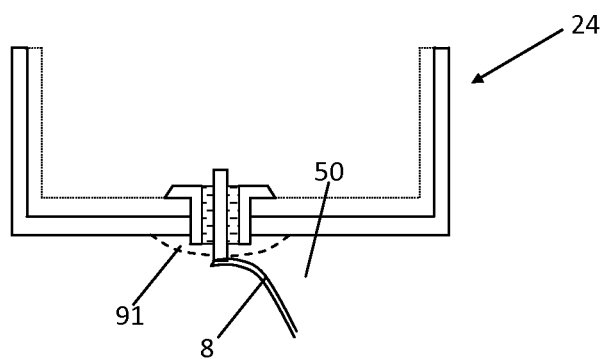
FIG. 9 depicts incorporation of polymeric insulation into the energy storage cell.

Referring now to FIG. 3, there is shown an exemplary energy storage cell 12. In this example, the energy storage cell 12 is a "jelly roll" type of construction. In these embodiments, sheets of materials (i.e., the current collectors 2, the energy storage media 1 and the separator 5) are rolled up into a tight package to provide a rolled storage cell 21 (i.e., a storage cell 12 that is suitably packaged for a given embodiment of the housing 7). At least one lead is coupled to a respective current collector 2 to provide electrical access to an appropriate layer of the energy storage cell 12. Generally, when assembled, a plurality of the leads are grouped to provide each of the terminals 8. In turn, each of the terminals 8 are coupled to a respective part of the housing 7 to provide for each contact 18. Generally, there are two terminals 8 (one for each electrode 3). However, for simplicity, only one of the terminals 8 is shown in FIGS. 3, 7 and 9.

Figure 4A:
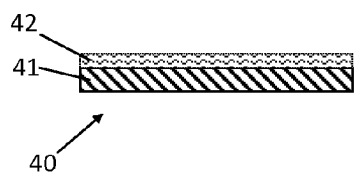
FIGS. 4A, 4B and 4C, collectively referred to herein as FIG. 4, depict additional aspects of the cap of FIG. 2.

Referring now to FIG. 4, aspects of embodiments of a blank 40 for the cap 24 are shown. In FIG. 4A, the blank 40 includes a multi-layer material. A first layer 41 of the multi-layer material is aluminum. A second layer 42 of the multi-layer material is stainless steel. In the embodiments of FIG. 4, the stainless steel (the second layer 42) is clad onto the aluminum (the first layer 41), thus providing for a material that exhibits a desired combination of metallurgical properties. That is, in some of the embodiments provided herein, aluminum is exposed to an interior of the housing 7 (i.e., the energy storage cell 12 is exposed to aluminum portions of the housing 7), while stainless steel is exposed to exterior. In this manner, advantageous electro-chemical properties of the aluminum are enjoyed, while structural properties (and metallurgical properties, e.g., weldability) of stainless steel are relied upon for construction. The multi-layer material may include additional layers as deemed appropriate.

As mentioned above, the first layer 41 of material may be clad onto (or with) the second layer 42 of material. As used herein, the terms "clad," "cladding" and the like refer to the bonding together of metals that are often dissimilar. Cladding is often achieved by extruding two metals through a die as well as pressing or rolling sheets together under high pressure. Other processes, such as laser cladding, may be used. A result is a sheet of material composed of at least two layers, where the at least two layers of material are bonded together such that the material may be worked with as a single sheet (e.g., formed as a single sheet of homogeneous material would be formed).

Figure 4B:
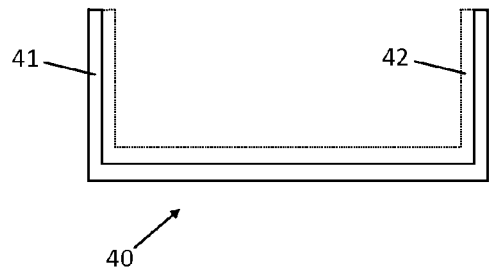
Figure 4C:
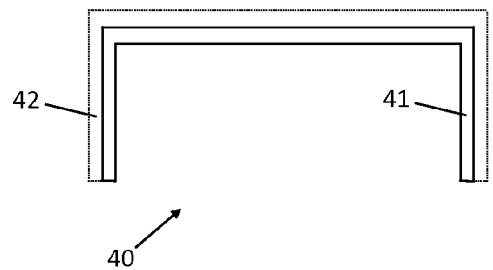

Referring still to FIG. 4A, in one embodiment, a sheet of flat stock (as shown) is used to provide the blank 40 to create a flat cap 24. A portion of the second layer 42 of material may be removed (such as around a circumference of the cap 24) in order to facilitate attachment of the cap 24 to the body 20. In FIG. 4B, another embodiment of the blank 40 is shown. In this example, the blank 40 is provided as a sheet of clad material that is formed into a concave configuration. In FIG. 4C, the blank 40 is provided as a sheet of clad material that is formed into a convex configuration. The cap 24 that is fabricated from the various embodiments of the blank 40 (such as those shown in FIG. 4), are configured to support welding of the cap 24 to the body 20 to provide the housing 7. More specifically, the embodiment of FIG. 4B is adapted for fitting within an inner diameter of the body 20, while the embodiment of FIG. 4C is adapted for fitting over an outer diameter of the body 20 (alternatively, each embodiment may be adapted for fitting within an inner diameter of the body 20, i.e., the layers of clad material within the sheet may be reversed). Methods to form the blank 40 into any one of the foregoing embodiments of the cap 24 include, without limitation, drawing, stamping and pressing of the blank 40. When assembled, the cap 24 may be welded to the body 20, thus providing users with a hermetic seal.

Figure 5:
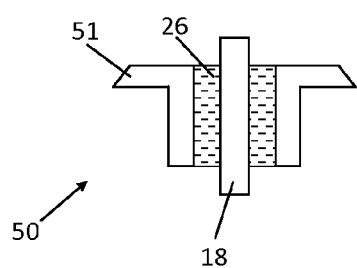
FIG. 5 is a cross-sectional view of an insert that includes a glass-to-metal seal.

Referring now to FIG. 5, there is shown an embodiment of an insert 50. The insert 50 is designed to be installed into the blank 40 and to provide electrical communication from the energy storage media to a user. Generally, the insert 50 includes a sleeve 51. The sleeve 51 surrounds the insulator 26, which in turn surrounds a pin that serves as the contact 18. In this example, the sleeve 51 is an annular cylinder with a flanged top portion. The insert 50 may be commonly referred to as a "glass-to-metal seal."

Figure 6:
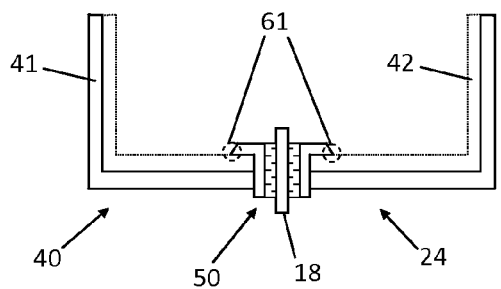
FIG. 6 is a cross-sectional view of the electrode assembly of FIG. 5 installed in the cap of FIG. 4B.

In order to assemble the cap 24, a suitable perforation (not shown) is made in the blank 40. The perforation has a geometry that is sized to match the insert 50. Accordingly, the insert 50 is inserted into perforation of the blank 40. Once the insert 50 is inserted, the insert 50 may be affixed to the blank 40 through a technique such as welding. The welding may be laser welding which welds about a circumference of the flange of sleeve 51. Referring to FIG. 6, first welding points 61 where welding is performed are shown. In this embodiment, the first welding points 61 provide for welding of stainless steel to stainless steel, a relatively simple welding procedure. Accordingly, the teachings herein provide for welding the insert 50 securely into place on the blank 40, thus resulting in the cap 24. Aspects of the insert 50 are discussed in greater depth further herein.

Refer now to FIG. 7 where the energy storage cell 12 is shown disposed within the body 20. The at least one terminal 8 is coupled appropriately (such as to the contact 18), and the cap 24 is mated with the body 20 to provide for the energy storage 10.

Figure 8A:
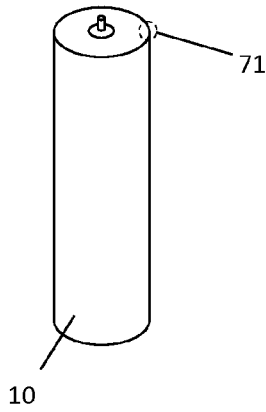
FIGS. 8A, 8B and 8C, collectively referred to herein as FIG. 8, depict embodiments of an assembled energy storage cell.
Figure 8B:
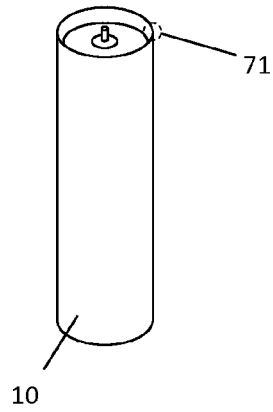
Figure 8C:
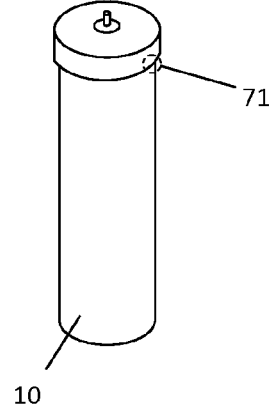

Once assembled, the cap 24 and the body 20 are sealed. FIG. 8 depicts various embodiments of the assembled energy storage 10. In FIG. 8A, a flat blank 40 (see FIG. 4A) is used to create a flat cap 24. Once the cap 24 is set on the body 20, the cap 24 and the body 20 are welded at second welding points 71 to create a seal. In this case, as the body 20 is an annular cylinder, the weld proceeds circumferentially about the body 20 and cap 24 to provide the seal. In a second embodiment, shown in FIG. 8B, the concave blank 40 (see FIG. 4B) is used to create a concave cap 24. Once the cap 24 is set on the body 20, the cap 24 and the body 2 are welded to create the seal. In a third embodiment, shown in FIG. 8C, the convex blank 40 (see FIG. 4C) is used to create a convex cap 24. Once the cap 24 is set on the body 20, the cap 24 and the body 20 are welded to create the seal. In these embodiments, the seal includes a weld of stainless steel to stainless steel, which is a relatively simple welding procedure.

In some embodiments, an insulative polymer may be used coat at least some of the parts of the housing 7 (i.e., an interior thereof) to insure that the only metal the components of the energy storage 10 are exposed to is compatible. Exemplary insulative polymer includes PFA, FEP, TFE, and PTFE. Suitable polymers (or other materials) are limited only by the needs of a system designer or fabricator and the properties of the respective materials. Reference may be had to FIG. 9, where a small amount of insulative material 91 is included to limit exposure of electrolyte to the stainless steel of the sleeve 51 and the electrode 18. The insulative material 91 may be coated over any surface desired, as is practicable. Generally, the insulative material 91 may be selected according to compatibility, cost, availability, needs of the user, designer, manufacturer, and by other similar considerations.

Figure 10:
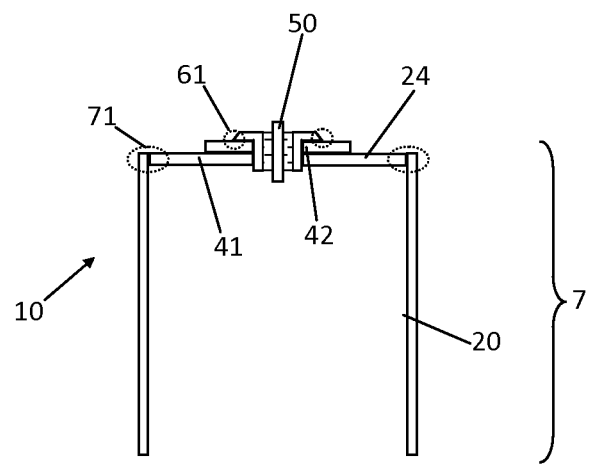
FIG. 10 depicts an additional embodiment of the housing for the energy storage

Aspects of a further embodiment are depicted in FIG. 10. In FIG. 10, the housing 7 includes an embodiment of the body 20 that is fabricated from material that is substantially aluminum. The cap 24 includes multilayer material, wherein the first layer 41 is also substantially aluminum, while the second layer 42 is stainless steel. A substantial portion of the second layer 42 has been removed, such that the first layer 41 is substantially exposed. In this manner, the second layer 42 may be used to provide a mounting area for the insert 50. In this embodiment, the insert 50 is secured at the first welding point 61, which includes a weld that is about a circumference of the insert 50. The cap 24, in turn, is welded at the second welding point 71 to provide the seal. In this embodiment, the second welding point 71 includes a weld that is about a circumference of the body 20.

Note that in various embodiments, the terminal 8 may include various sub-components. For example, the terminal 8 may include a plurality of leads (as discussed above). At least one of a "bridge" and a "jumper" may be used as well (neither of which are shown herein). The bridge and the jumper may include a variety of materials as deemed appropriate. Generally, the bridge and the jumper serve as intermediary devices to facilitate coupling of the terminal 8 to the contact 18. For example, the bridge may be coupled to the pin (i.e., contact 18), while the jumper may be included to provide for connecting the bridge to terminal 8. Use of various connections may facilitate the assembly process, and take advantage of certain assembly techniques. For example, the bridge may be laser welded or resistance welded to the pin, and coupled with an ultrasonic weld to the jumper. Aside from providing for facilitation of couplings, the bridge and the jumper may serve as intermediary devices to provide for bonding of otherwise incompatible materials (and thereby improving, for example, physical strength of a given coupling).

Generally, a fill port (a perforation in a surface of the housing 7) is included in the housing 7, or may be later added. Once the energy storage 10 has been filled with electrolyte 6, the fill port may then be closed. Closing the fill port may be completed, for example, by welding material (e.g., a metal that is compatible with the housing 7) into or over the fill port. In some embodiments, the fill port may be temporarily closed prior to filling, such that the energy storage 10 may be moved to another environment, for subsequent re-opening, filling and closure. However, as discussed herein, it is considered that the energy storage 10 is dried and filled in the same environment.

A number of methods may be used to fill the housing 7 with a desired quantity of electrolyte 6. Generally, controlling the fill process may provide for, among other things, increases in capacitance, reductions in equivalent-series-resistance (ESR), and limiting waste of electrolyte 6. A vacuum filling method is provided as a non-limiting example of a technique for filling the housing 7 and wetting the storage cell 12 with the electrolyte 6.

Note that measures may be taken to ensure that any material that has a potential to contaminate components of the energy storage 10 is clean, compatible and dry. As a matter of convention, it may be considered that "good hygiene" is practiced to ensure assembly processes and components do not introduce contaminants into the energy storage 10. Also, as a matter of convention, it may be considered that a "contaminant" may be defined as any unwanted material that will negatively affect performance of the energy storage 10 if introduced. Also note, that generally herein, contaminants may be assessed as a concentration, such as in parts-per-million (ppm). The concentration may be taken as by weight, volume, sample weight, or in any other manner as determined appropriate.

In the "vacuum method" a container is placed onto the housing 7 around the fill port. A quantity of electrolyte 6 is then placed into the container in an environment that is substantially free of oxygen and water (i.e., moisture). A vacuum is then drawn in the environment, thus pulling any air out of the housing and thus simultaneously drawing the electrolyte 6 into the housing 7. The surrounding environment may then be refilled with inert gas (such as argon, nitrogen, or the like, or some combination of inert gases), if desired. The energy storage 10 may be checked to see if the desired amount of electrolyte 6 has been drawn in. The process may be repeated as necessary until the desired amount of electrolyte 6 is in the energy storage 10.

After filling with electrolyte 6, in some embodiments, material may be fit into the fill port to seal the energy storage 10. The material may be, for example, a metal that is compatible with the housing 7 and the electrolyte 6. In one example, material is force fit into the fill port, essentially performing a "cold weld" of a plug in the fill port. Of course, the force fit may be complimented with other welding techniques as discussed further herein.

Having thus described embodiments of the housing 7, additional aspects are now provided. These additional aspects include a more detailed discussion of the insert 50, which may include a glass-to-metal seal; materials used in construction of the housing 7, suitable techniques for welding; as well as any special considerations. Additionally, some definitions are provided.

Turning now to the insert 50, material for constructing the sleeve 51 may include various types of metals or metal alloys. Generally, materials for the sleeve 51 are selected according to, for example, structural integrity and bondability (to the blank 40). Exemplary materials for the sleeve 51 include 304 stainless steel or 316 stainless steel. Material that may be used for the pin (i.e., the contact 18) may include various types of metals or metal alloys. Generally, materials for the pin are selected according to, for example, structural integrity and electrical conductance. Exemplary materials for the pin include 446 stainless steel or 52 alloy.

Generally, the insulator 26 is bonded to the sleeve 51 and the pin (the contact 18) through known techniques (i.e., glass-to-metal bonding). Material for constructing the insulator 26 may include, without limitation, various types of glass, including high temperature glass, ceramic glass or ceramic materials. Generally, materials for the insulator are selected according to, for example, structural integrity and electrical resistivity (i.e., electrical insulation properties), compatibility with electrolyte and a thermal coefficient of expansion (TCE). Generally, it is desirable to select material for the insulator where the TCE is generally compatible with the TCE of the sleeve 51 and the contact 18 (i.e., the pin).

A number of aspects of the glass-to-metal seal may be configured as desired. For example, dimensions of the sleeve 51 and the pin, and the material of the sleeve 51 and the pin may be modified as appropriate. The pin may also be hollow (i.e., a closed tube) or solid. Multiple pins may be included in one insulator 26 and/or one cap 24. While the most common types of material used for the pin are stainless steel alloys, copper cored stainless steel, molybdenum, platinum-iridium, various nickel-iron alloys, tantalum and other metals, some non-traditional materials may be used (such as aluminum). The sleeve 51 may be usually formed of stainless steel, titanium and/or various other materials as deemed appropriate.

In some embodiments, the contact 18 is formed of metal such as at least one of KOVAR™ trademark of Carpenter Technology Corporation of Reading, Pa., where KOVAR is a vacuum melted, iron-nickel-cobalt, low expansion alloy whose chemical composition is controlled within narrow limits to assure precise uniform thermal expansion properties), Alloy 52 (a nickel iron alloy suitable for glass and ceramic sealing to metal), tantalum, molybdenum, niobium, tungsten, Stainless Steel 446 (a ferrific, non-heat treatable stainless steel that offers good resistance to high temperature corrosion and oxidation) and titanium.

The sleeve 51 of the insert 50 may be fabricated from 300 series stainless steels, such as 304, 304L, 316, and 316L alloys. The sleeve 51 may also be made from metal such as at least one of various nickel alloys, such as Inconel (a family of austenitic nickel-chromium-based superalloys that are oxidation and corrosion resistant materials well suited for service in extreme environments subjected to pressure and heat) and Hastelloy (a highly corrosion resistant metal alloy that includes nickel and varying percentages of molybdenum, chromium, cobalt, iron, copper, manganese, titanium, zirconium, aluminum, carbon, and tungsten).

The insulator 26 may include a form of glass. Generally, composition of the glass is proprietary to each manufacturer of the respective insert 50. Other insulative materials may be used in the glass-to-metal seal. For example, various polymers, ceramics, other non-conductive materials and the like may be used in the seal. As such, the term "glass-to-metal" seal is merely descriptive of a type of seal, and is not meant to imply that the seal must include glass.

Specific examples of glass-to-metal seals that have been used in the energy storage 10 include two different types of glass-to-metal seals. A first one is from SCHOTT with a US location in Elmsford, N.Y. This embodiment uses a stainless steel pin, a glass insulator, and a stainless steel sleeve. A second glass-to-metal seal is from HERMETIC SEAL TECHNOLOGY of Cincinnati, Ohio. This second embodiment uses a tantalum pin, glass insulator and a stainless steel sleeve. Varying sizes of the various embodiments may be provided.

A number of aspects of the glass-to-metal seal may be configured as desired. For example, dimensions of housing and pin, and the material of the pin and housing may be modified as appropriate. The pin can also be a tube or solid pin, as well as have multiple pins in one cover. While the most common types of material used for the pin are stainless steel alloys, copper cored stainless steel, molybdenum, platinum-iridium, various nickel-iron alloys, tantalum and other metals, some non-traditional materials may be used (such as aluminum). The housing is usually formed of stainless steel, titanium and/or various other materials.

A variety of fastening techniques may be used in assembly of the energy storage 10. For example, and with regards to welding, a variety of welding techniques may be used. The following is an illustrative listing of types of welding and various purposes for which each type of welding may be used.

A variety of materials may be used in construction of the energy storage 10. Integrity of the energy storage 10 is essential if oxygen and moisture are to be excluded and the electrolyte 6 is to be prevented from escaping. To accomplish this, seam welds and any other sealing points should meet standards for hermiticity over the intended temperature range for operation. Also, materials selected should be compatible with other materials, such as ionic liquids and solvents that may be used in the formulation of the electrolyte 6.

The housing 7 for the energy storage 10 may be made from, for example, types 304, 304L, 316, and 316L stainless steels. They may also be constructed from, but not limited to, some of the aluminum alloys, such as 1100, 3003, 5052, 4043 and 6061. Various multi-layer materials may be used, and may include, for example, aluminum clad to stainless steel. Other non-limiting compatible metals that may be used include platinum, gold, rhodium, ruthenium and silver.

A variety of fastening techniques may be used in assembly of the energy storage 10. For example, and with regards to welding, a variety of welding techniques may be used. The following is an illustrative listing of types of welding and various purposes for which each type of welding may be used.

Ultrasonic welding may be used for, among other things: welding aluminum leads to the current collector; welding leads to an internal bottom portion of the housing (or, for example, a cap 24 or cover for an opposing end of the body 20); welding a jumper to a clad bridge connected to the glass-to-metal seal pin; and welding leads together. Pulse or resistance welding may be used for, among other things: welding leads to the body 20 or to the contact 18 (i.e., the pin); welding leads to the current collector; welding a jumper to a clad bridge; welding a clad bridge to the terminal 8; welding leads to the body 20 or a cap 24. Laser welding may be used for, among other things: welding a stainless steel cap 24 to a stainless steel body 20; welding a stainless steel bridge to a stainless steel contact 18 (pin of the glass-to-metal); and welding a plug into the fill port. TIG welding may be used for, among other things: sealing aluminum portions of the cap 24 to aluminum portions of the body 20; and welding of an aluminum sleeve 51 to the blank 40. Cold welding (compressing metals together with high force) may be used for, among other things: sealing the fill port by force fitting an aluminum ball or tack into the fill port. Generally, cold welding is complimented with another type of welding, such as laser welding to ensure hermetic sealing of the energy storage 10.

Additional or other techniques for coupling the insert 50 to the blank 40 include use of a bonding agent under the flange of the sleeve 51 (between the flange and the second layer of material 42), when such techniques are considered appropriate. The cap 24 is ready for installation once the insert 50 has been affixed or attached to the blank 40.

Other techniques may be used to seal the housing 7. For example, laser welding, TIG welding, resistance welding, ultrasonic welding and other forms of mechanical sealing such as crimping, beading and the like may be used. It should be noted, however, that in general, traditional forms of mechanical sealing alone are not adequate for providing the robust hermetic seal offered in the energy storage 10.

In some embodiments, the multi-layer material is used for internal components. For example, aluminum may be clad with stainless steel to provide for a multi-layer material in the terminals 8. In some of these embodiments, a portion of the aluminum may be etched away (such as by use of KOH), or otherwise removed, to expose the stainless steel. The exposed stainless steel may then be used to attach the terminal 8 to the contact 18 by use of simple welding procedures.

Using the clad material for internal components may call for particular embodiments of the clad material. For example, it may be beneficial to use clad material that include aluminum (bottom layer), stainless steel (intermediate layer) and aluminum (top layer), which thus limits exposure of stainless steel to the internal environment of the energy storage 10. These embodiments may be augmented by, for example, additional coating with polymeric materials, such as PTFE.

With regard to implementation of a flat cap 24 and a housing 7 that includes a stainless steel exterior, a body 20 of stainless steel may be welded (e.g., by laser welding) to a stainless steel portion of the cap 24. The sleeve 51 of the glass-to-metal seal may also be welded (e.g., by laser welding) to the stainless steel cap 24.

Another cap 24 may be used. For example, in the case of the body 20 that is an annular cylinder, the another cap 24 may be used at an opposing end. The another cap 24 may be used in the same manner as discussed above (such as with a glass-to-metal seal), or may be provided without the insert 50. In these latter embodiments without the insert, the respective terminal 8 may be coupled directly to the material of the cap 24 (such as by welding (e.g., for example, ultrasonic welding) of the terminal 8 to an inner surface of the cap 24 (e.g., to an aluminum surface of the clad bottom), and then welding (e.g., by laser welding) the stainless steel on the outer part of the cap 24 to the stainless steel portion of the body 20.

Also a seal to the fill port in the form of, for example, a tack or a plug may be welded (e.g., by laser welding) to the stainless steel housing to close the energy storage 10.

In some embodiments, an outer portion of the stainless steel clad is removed to expose the aluminum clad of the multilayer material. There still remains enough of the stainless steel clad to weld (e.g., by laser welding) the glass to metal seal to the stainless steel layer in the clad material. The exposed aluminum may be welded (e.g., by TIG welding, with a welding groove) to the aluminum body to create the hermetic seal.

In some embodiments, a welding groove may be used. Generally, the welding groove provides for even heat distribution during the welding process. By way of example, in one embodiment, the welding groove is provided in the cap 24. The welding groove may be set back from an edge of the cap 24. Accordingly, weld material of the cap 24 is generally of a thickness that is approximately equivalent to a thickness of the body 20.

Some exemplary embodiments include those where the body 20 is fabricated from aluminum, a flat cap of clad material is used (exposed Al) for the top, a flat cap of clad material is used (exposed Al) for the bottom. Some embodiments may make use of a stainless steel body, a flat clad top and a flat clad bottom. In other embodiments, the housing 7 may include an aluminum can, a drawn clad top (concave, aluminum on outside, stainless steel on inside, cover goes inside of can), flat clad bottom (exposed Al).

Stainless steel can, drawn clad top (convex, stainless on outside, aluminum on inside with some aluminum removed near top edge, cover goes outside of can).

Accordingly, the teachings herein provide an energy storage 10 that exhibits leakage current with comparatively low initial values and substantially slower increases in leakage current over time in view of the prior art. Significantly, the leakage current of the energy storage 10 remains at practical (i.e., desirably low) levels when the energy storage 10 is exposed to ambient temperatures for which prior art capacitors would exhibit prohibitively large initial values of leakage current and/or prohibitively rapid increases in leakage current over time.

As a matter of convention, the term "leakage current" generally refers to current drawn by the energy storage 10 which is measured after a given period of decay time. Leakage current may be determined in a number of ways. Qualitatively, leakage current may be considered as current drawn into a device, once the device has reached a state of equilibrium. In practice, it is always or almost always necessary to estimate the actual leakage current as a state of equilibrium that may generally only by asymptotically approached. Thus, the leakage current in a given measurement may be approximated by measuring the current drawn into the energy storage 10, while the energy storage 10 is held at a substantially fixed voltage and exposed to a substantially fixed ambient temperature for a relatively long period of time. In some instances, a relatively long period of time may be determined by approximating the current time function as an exponential function, then allowing for several (e.g, about 3 to 5) characteristic time constants to pass. Often, such a duration ranges from about 50 hours to about 100 hours for many ultracapacitor technologies. Alternatively, if such a long period of time is impractical for any reason, the leakage current may simply be extrapolated, again, perhaps, by approximating the current time function as an exponential or any approximating function deemed appropriate. Notably, leakage current will generally depend on ambient temperature. So, in order to characterize performance of a device at a temperature or in a temperature range, it is generally important to expose the device to the ambient temperature of interest when measuring leakage current.

Generally, the energy storage 10 may be used under a variety of environmental conditions and demands. For example, terminal voltage may range from about 100 mV to about 5 V. Ambient temperatures may range from about minus 40 degrees Celsius to about 250 degrees Celsius. Often, ambient temperatures range from about plus 60 degrees Celsius to about plus 210 degrees Celsius. It has been found that the temperature rating of the housing 7 is generally limited by performance of the insert 50 (i.e., the glass-to-metal seal). Accordingly, as it is recognized that use of glass-to-metal seals that have a high temperature rating (e.g., above about 250 degrees Celsius) will result in a housing 7 that supports rating the energy storage 10 for temperatures that exceed 250 degrees Celsius. Some of these seals may use materials other than glass, such as advanced embodiments of polymers, adhesives, bonding agents and sealants.

Performance requirements for leakage current are generally defined by the environmental conditions prevalent in a particular application. For example, with regard to a capacitor having a volume of 20 mL, a practical limit on leakage current may fall below 100 mA.

For example, in automotive applications, ambient temperatures of 105 degrees Celsius may be realized (where a practical lifetime of the capacitor will range from about 1 year to 20 years). In some downhole applications, such as for geothermal well drilling, ambient temperatures of 300 degrees Celsius or more may be reached (where a practical lifetime of the capacitor will range from about 10 hours to 10,000 hours).

A "lifetime" for the capacitor is also generally defined by a particular application and is typically indicated by a certain percentage increase in leakage current or degradation of another parameter (as appropriate or determinative for the given application). For instance, in one embodiment, the lifetime of a capacitor in an automotive application may be defined as the time at which the leakage current increases to 200% of its initial (beginning of life or "BOL") value.

Additionally, the energy storage 10 may exhibit other benefits as a result of reduced reaction between the housing 7 and the energy storage cell 12. For example, an effective series resistance (ESR) of the energy storage 10 may exhibit comparatively lower values over time. Further, the unwanted chemical reactions that take place in a prior art capacitor often create unwanted effects such as out-gassing, or in the case of a hermetically sealed housing, bulging of the housing 7. In both cases, this leads to a compromise of the structural integrity of the housing 7 and/or hermetic seal of the energy storage 10. Ultimately, this may lead to leaks or catastrophic failure of the prior art capacitor. These effects may be substantially reduced or eliminated by the application of a disclosed barrier.

Turning to estimation of ESR, the effective series resistance (ESR) of the ultracapacitor may also be measured in a number of ways. One method involves monitoring the voltage presented at the capacitor terminals while a known current is drawn from (during a "discharge") or supplied to (during a "charge") the ultracapacitor. More specifically, one may use the fact that ESR is governed by the equation:

$V=I*R$, where I represents the current effectively passing through the ESR, R represents the resistance value of the ESR, and V represents the voltage difference provided by the ESR (the ESR drop). ESR may generally be a lumped element approximation of dissipative or other effects within the ulracapacitor. Behavior of the ultracapacitor is often derived from a circuit model comprising an ideal capacitor in series with a resistor having a resistance value equal to the ESR. Generally, this yields good approximations of actual capacitor behavior.

In one method of measuring ESR, one may begin drawing a discharge current from a capacitor that had been at rest (one that had not been charging or discharging with a substantial current). During a time interval in which the change in voltage presented by the capacitor due to the change in stored charge on the capacitor is small compared to the measured change in voltage, that measured change in voltage is substantially a reflection of the ESR of the capacitor. Under these conditions, the immediate voltage change presented by the capacitor may be taken as an indicator, through computation, of the ESR.

For example, upon initiating a discharge current draw from a capacitor, one may be presented with an immediate voltage change DeltaV over a measurement interval DeltaT. So long as the capacitance of the capacitor, C, discharged by the known current, I, during the measurement interval, DeltaT, would yield a voltage change that is small compared to the measured voltage change, DeltaV, one may divide DeltaV during the time interval DeltaT by the discharge current, I, to yield an approximation to the ESR. When I is measured in amperes and DeltaV in volts, the ESR result will have units of Ohms.

Both ESR and capacitance may depend on ambient temperature. Therefore, a relevant measurement may require the user to subject the energy storage 10 to a specific ambient temperature of interest during the measurement.

Accordingly, users are now provided with a housing 7 for the energy storage 10, where substantially all interior surfaces of the housing 7 may be provided as aluminum, while manufacturers enjoy the benefits of material such as stainless steel to facilitate construction. Thus problems of internal corrosion are avoided, and designers are afforded greater flexibility in selection of appropriate electrolyte.

As a highly efficient seal of the housing 7 is desired. That is, preventing intrusion of the external environment (such as air, humidity, etc, . . . ) helps to maintain purity of the components of the energy storage cell 12. Further, this prevents leakage of electrolyte and the like from the energy storage cell 12. Thus, as discussed herein, "hermetic" refers to a seal whose quality (i.e., leak rate) is defined in units of "standard He-cc/second," which means one cubic centimeter of gas (e.g., He) per second at ambient atmospheric pressure and temperature. This is equivalent to an expression in units of "standard He-cc/sec." Further, it is recognized that 1 standard He-cc/sec is equal to 1.01325 mbar-liter/sec. Generally, the energy storage 10 disclosed herein is capable of providing a hermetic seal that has a leak rate no greater than about $5.0 \times 10^{-6}$ standard He-cc/sec, and may exhibit a leak rate no higher than about $5.0 \times 10^{-10}$ standard He-cc/sec. It is also considered that performance of a successfully hermetic seal is to be judged by the user, designer or manufacturer as appropriate, and that "hermetic" ultimately implies a standard that is to be defined by a user, designer, manufacturer or other interested party.

Leak detection may be accomplished, for example, by use of a tracer gas. Using tracer gas such as helium for leak testing is advantageous as it is a dry, fast, accurate and non-destructive method. In one example of this technique, the energy storage 10 is placed into an environment of helium. The energy storage 10 is subjected to pressurized helium. The energy storage 10 is then placed into a vacuum chamber that is connected to a detector capable of monitoring helium presence (such as an atomic absorption unit). With knowledge of pressurization time, pressure and internal volume, the leak rate of the energy storage 10 may be determined.

In some embodiments, the energy storage 10 includes two contacts. The two contacts are the glass-to-metal seal pin (i.e., the feed-through 19) and the entire rest of the housing 7. When connecting a plurality of the energy storage 10 in series, it is often desired to couple an interconnection between a bottom of the housing 7 (in the case of the cylindrical form housing 7), such that distance to the internal leads is minimized, and therefore of a minimal resistance. In these embodiments, an opposing end of the interconnection is usually coupled to the pin of the glass-to-metal seal.

With regard to interconnections, a common type of weld involves use of a parallel tip electric resistance welder. The weld may be made by aligning an end of the interconnection above the pin and welding the interconnection directly to the pin. Using a number of welds will increase the strength and connection between the interconnection and the pin. Generally, when welding to the pin, configuring a shape of the end of the interconnection to mate well with the pin serves to ensure there is substantially no excess material overlapping the pin that would cause a short circuit.

An opposed tip electric resistance welder may be used to weld the interconnection to the pin, while an ultrasonic welder may used to weld the interconnection to the bottom of the housing 7. Soldering techniques may used when metals involved are compatible.

With regard to materials used in interconnections, a common type of material used for the interconnection is nickel. Nickel may be used as it welds well with stainless steel and has a strong interface. Other metals and alloys may be used in place of nickel, for example, to reduce resistance in the interconnection.

Generally, material selected for the interconnection is chosen for compatibility with materials in the pin as well as materials in the housing 7. Exemplary materials include copper, nickel, tantalum, aluminum, and nickel copper clad. Further metals that may be used include silver, gold, brass, platinum, and tin.

In some embodiments, such as where the pin is made of tantalum, the interconnection may make use of intermediate metals, such as by employing a short bridge connection. An exemplary bridge connection includes a strip of tantalum, which has been modified by use of the opposed tip resistance welder to weld a strip of aluminum/copper/nickel to the bridge. A parallel resistance welder is then used to weld the tantalum strip to the tantalum pin.

The bridge may also be used on the contact that is the housing 7. For example, a piece of nickel may be resistance welded to the bottom of the housing 7. A strip of copper may then be ultrasonic welded to the nickel bridge. This technique helps to decrease resistance of cell interconnections. Using different metals for each connection can reduce the ESR of the interconnections between cells in series.

Once the energy storage 10 is fabricated, it may be used in high temperature applications with little or no leakage current and little increase in resistance. The energy storage 10 described herein can operate efficiently at temperatures from about minus 40 degrees Celsius to about 210 degrees Celsius with leakage currents normalized over the volume of the device less than 1 amp per liter (A/L) of volume of the device within the entire operating voltage and temperature range.

By reducing the moisture content in the energy storage 10 (e.g., to less than 500 part per million (ppm) over the weight and volume of the electrolyte and the impurities to less than 1,000 ppm), the energy storage 10 can efficiently operate over the temperature range, with a leakage current (I/L) that is less than 1,000 mAmp per Liter within that temperature range and voltage range.

In one embodiment, leakage current (I/L) at a specific temperature is measured by holding the voltage of the energy storage 10 constant at the rated voltage (i.e., the maximum rated operating voltage) for seventy two (72) hours. During this period, the temperature remains relatively constant at the specified temperature. At the end of the measurement interval, the leakage current of the energy storage 10 is measured.

In some embodiments, a maximum voltage rating of the energy storage 10 is about 4 V at room temperature. An approach to ensure performance of the energy storage 10 at elevated temperatures (for example, over 210 degrees Celsius), is to derate (i.e., to reduce) the voltage rating of the energy storage 10. For example, the voltage rating may be adjusted down to about 0.5 V, such that extended durations of operation at higher temperature are achievable.

One skilled in the art will recognize that the various components or technologies may provide certain necessary or beneficial functionality or features. Accordingly, these functions and features as may be needed in support of the invention and variations thereof, are recognized as being inherently included as a part of the teachings herein and a part of the invention disclosed.

As a matter of convention, the term "may" is to be construed as optional, the term "includes" is to be construed in an open ended fashion, that is, "includes" does not exclude other elements not listed herein; "should" is likewise a term that expresses an optional condition; "a" and "an" are generally used to introduce elements, while "the" or "said" generally refers back to previously introduced elements, but in reference backwards, may also account for additional or other aspects not previously introduced.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A housing for an energy storage cell, the housing comprising:
a body comprising a first material and a cap formed of a multi-layer material, the cap comprising a hermetically sealed electrode assembly disposed therein;

wherein a first layer of the multi-layer material is compatible with the first material, and a second layer of the multi-layer material is compatible with hermitically sealing the assembly to the cap, and wherein the hermetically sealed electrode assembly is configured to maintain a leak rate of less than $5.0 \times 10^{-6}$ standard He-cc/sec at temperatures throughout an operational temperature range of about −40 degrees Celsius to about 210 degrees Celsius.

2. The housing of claim 1, wherein the first layer comprises one of aluminum and an aluminum alloy.

3. The housing of claim 1, wherein the second layer comprises stainless steel.

4. The housing of claim 1, wherein the hermetic seal comprises a weld.

5. The housing of claim 1, wherein the multi-layer material comprises aluminum clad with stainless steel.

6. The housing of claim 1, wherein the electrolyte of the energy storage cell substantially does not react with at least one of the first material and the first layer.

7. The housing of claim 6, wherein, the hermetically sealed electrode assembly is rated for operation at temperatures up to about 250 degrees Celsius.

8. A method for housing an energy storage cell, the method comprising:
    selecting a body comprising a first material that exhibits low chemical reactivity with an electrolyte;
    selecting a cap formed of a multi-layer material, the cap comprising a hermetically sealed electrode assembly disposed therein, wherein a first layer of the multi-layer material is compatible with the first material, and a second layer of the multi-layer material is compatible with hermitically sealing the assembly to the cap; and
    placing the storage cell within the body,
    wherein the hermetically sealed electrode assembly is configured to maintain a leak rate of less than $5.0 \times 10^{-6}$ standard He-cc/sec at temperatures throughout an operational temperature range of −40 degrees Celsius to 210 degrees Celsius.

9. The method as in claim 8, further comprising filling the body with an electrolyte.

10. The method as in claim 9, further comprising hermetically sealing the body and the cap together.

11. An energy storage comprising:
    an energy storage cell disposed within a housing comprising a cap hermetically sealed to a body, the body formed of a first material that exhibits low chemical reactivity with an electrolyte; the cap formed of a multi-layer material and comprising a hermetically sealed electrode assembly disposed therein;
    wherein the hermetically sealed electrode assembly is configured to maintain a leak rate of less than $5.0 \times 10^{-6}$ standard He-cc/sec at temperatures throughout an operational temperature range of −40 degrees Celsius to 210 degrees Celsius.

12. The energy storage of claim 11, wherein a first layer of the multi-layer material is compatible with the first material and a second layer is compatible with hermetically sealing the assembly to the cap.

13. The energy storage of claim 11, wherein the cell comprises one of a battery and a ultracapacitor.

14. The energy storage of claim 11, wherein the cell comprises a carbonaceous energy storage media.

15. The energy storage of claim 11, further comprising an electrolyte disposed within the housing.

16. The energy storage of claim 11, further comprising at least one lead that is electrically coupled to one of the electrode and the housing.

17. The energy storage of claim 16, wherein the lead comprises a multi-layer material.

18. The energy storage of claim 17, wherein a portion of the multi-layer material of the lead has been removed for the electrical coupling.

19. The energy storage of claim 11, wherein the hermetically sealed electrode is retained with an insert.

20. The energy storage of claim 19, wherein the insert comprises a glass insulator surrounded by a metallic sleeve.

21. An energy storage comprising:
    a housing comprising:
        a cap; and
        a body comprising a multilayer material;
    wherein the multilayer material comprises:
        a first layer of material that is substantially compatible with an electrolyte of an energy storage cell disposed within the housing; and
        at least a second layer at least partially disposed over the first layer, wherein the second layer provides structural integrity for the housing;
    wherein at least a portion of the first layer faces an interior of the housing and is exposed to the electrolyte; and
    wherein the portion of the first layer that faces the interior of the housing is configured to conduct electricity to or from the energy storage,
    wherein the cap comprises a cap formed of a multi-layer cap material, the cap comprising a hermetically sealed electrode assembly disposed therein;
    wherein a first layer of the multi-layer cap material is compatible with a material of the body, and a second layer of the multi-layer cap material is compatible with hermetically sealing the assembly to the cap, and
    wherein the hermetically sealed electrode assembly is configured to maintain a leak rate of less than $5.0 \times 10^{-6}$ standard He-cc/sec at temperatures throughout an operational temperature range of −40 degrees Celsius to 210 degrees Celsius.

22. The energy storage of claim 21, wherein the second layer is clad to the first layer.

23. The energy storage of claim 21, wherein the second layer comprises steel.

24. The energy storage of claim 21, wherein the first layer comprises at least one of aluminum and an aluminum alloy.

25. The energy storage of claim 21, wherein the housing comprises a glass-to-metal seal.

26. The energy storage of claim 21, wherein the energy storage cell comprises carbonaceous energy storage media.

27. The energy storage of claim 21, wherein the first layer of material is substantially electrochemically compatible with the electrolyte.

28. The energy storage of claim 21, wherein the energy storage cell is coupled to a first electrical contact of the housing and a second electrical contact of the housing.

29. The energy storage of claim 21, wherein the coupling comprises an ultrasonic weld.

30. The energy storage of claim 21, wherein the housing is hermetically sealed.

31. The energy storage of claim 30, wherein a leak rate of the housing is no greater than about $5.0 \times 10^{-6}$ standard He-cc/sec at temperatures throughout an operational temperature range.

32. The energy storage of claim 31, wherein a glass-to-metal seal disposed in the housing provides a first electrical contact with a first electrode of the energy storage cell.

33. The energy storage of claim 32, wherein a body of the housing provides a second electrical contact with a second electrode of the energy storage cell.

34. The energy storage of claim 21, wherein the housing is adapted for interconnection with another energy storage.

35. The energy storage of claim 31, wherein the energy storage exhibits a volumetric leakage current that is less than 1,000 mAmp per Liter throughout the operational temperature range and an operational voltage range.

36. The energy storage of claim 35, wherein the temperature range is from about 60 degrees Celsius to about 250 degrees Celsius and the voltage range is from about 100 mV to about 5V.

\* \* \* \* \*